United States Patent Office 2,870,163
Patented Jan. 20, 1959

2,870,163
CONVERSION OF ORGANIC SULFIDES TO SULFONES

Horace R. Davis, Cedar Grove, and David P. Sorensen, Bloomfield, N. J., assignors to The M. W. Kellogg Company, Jersey City, N. J., a corporation of Delaware No Drawing. Application December 12, 1956
Serial No. 627,745

19 Claims. (Cl. 260—327)

This invention relates to the production of organic sulfones from organic sulfides by treatment of the sulfides with an oxide of nitrogen in the presence of osmium tetroxide as a catalyst.

Organic sulfones are useful as solvents for various chemical compounds, such as polyacrylonitrile and are also useful as extraction solvents for the separation of aromatic hydrocarbons from aliphatic hydrocarbons. Owing to their unusual thermal stability, the sulfones are valuable heat transfer agents. Although these compounds are unaffected by aqueous acids and aqueous alkalies, with certain reagents the sulfones act as chemical intermediates in the preparation of metal complexes which are useful in electroplating, azo dyes and the like. Certain sulfones such as sulfonal, tetronal and the like are useful medicinally as hypnotics. Aryl sulfones have been found to be useful as paper impregnators in capacitors.

It has been found in accordance with the present invention, that organic sulfides may be converted directly to sulfones by treatment with an inorganic oxide of nitrogen in the presence of osmium tetroxide as a catalyst. The organic sulfides which may be converted in accordance with this invention contain a sulfur atom which is singly bonded to an organic radical. One type of sulfide included in this group is illustrated by the formula $$[R\!-\!S\!-\!R']_n$$

in which $n$ is an integer from 1 to 100 or more, and R and R' may be identical or different organic radicals such as saturated hydrocarbon alkyl radicals of the homologous series methyl, ethyl, propyl, butyl, cetyl, eicosyl, heptacontyl, and the like, and isomers thereof; mono- and polyolefinic hydrocarbon radicals derived from the homologous series of unsaturated compounds ethylene, propylene, butylene, and the like, and propadiene, butadiene, and the like, and isomers thereof; saturated cyclic hydrocarbon radicals derived from cyclobutane, cyclopentane, cyclohexane, and the like, and isomers thereof; unsaturated cyclic hydrocarbon radicals derived from cyclobutene, cyclohexene, cyclooctatetraene, cyclohexadiene, cyclopentadiene, and the like, and isomers thereof; saturated and unsaturated heterocyclic radicals derived from quinone, pyrrolidine, thiophene, indole, carbazole, pyridine, acridine, and the like, and isomers thereof; and aromatic radicals derived from benezene, naphthalene, anthracene, and the like, including alkyl, alkenyl and halogen substituted aromatic radicals such as those derived from styrene, ethyl benzene, trichloromethyl benzene, toluene, xylene, diethyl benzene, and the like.

The carbon atoms of the organic sulfide may be partially or totally substituted with any of the halogens; with alkyl radicals derived from the homologous series ethane, propane, butane, and the like, and isomers thereof; with olefinic radicals derived from the homologous series ethylene, propylene, butylene, and the like, and isomers thereof; with diolefinic radicals derived from butadiene, and the like, and isomers thereof; and/or with functional groups such as C=O, $NO_2$, COOH, COOR, SO, and the like.

Organic polysulfides, in which the sulfide groups are separated by at least one carbon atom, may also be converted in accordance with this invention, the following formula being exemplary of this type of polysulfide $$[R\!-\!S\!-\!(R')_n\!-\!S\!-\!R'']_m$$

in which $n$ and $m$ are integers from 1 to 100 or more, $n$ preferably being an integer from between about 1 and about 10 and $m$ preferably being an integer between 1 and 20; R, R', and R" are identical or different radicals and may be any of those listed for R and R' above. Examples of these polysulfides are 2,2-bis(ethylthio)butane, 2,2-bis(ethylthio)propane, 3,3-bis(ethylthio)pentane, etc.

Heterocyclic organic sulfides may also be converted to sulfones in accordance with the process of this invention, exemplary of sulfides of this type being tetramethylene sulfide, thioxane and the like.

Generally, the organic sulfides which may be oxidized by the process of the present invention are those sulfides containing a

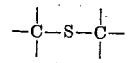

group, examples of which are given above.

The preferred organic sulfides which are oxidized in accordance with the process of the invention are the hydrocarbon sulfides having between 2 and 50 carbon atoms in the molecule, and most preferably the aliphatic hydrocarbon sulfides wherein the aliphatic substituents on the sulfur atom are identical and each contain between 1 and 10 carbon atoms. Some specific examples of these preferred types of sulfides are dimethyl sulfide, diethyl sulfide, methyl butyl sulfide, ethyl propyl sulfide, methyl ethyl sulfide, diphenyl sulfide, methyl phenyl sulfide, methyl octyl sulfide, methylene bis(methylsulfide), 2,2-bis-(ethylthio)butane, 2,2-bis(ethylthio)propane, 3,3-bis(ethylthio)pentane, etc. Although higher molecular weight sulfides are readily converted to sulfones, uses for the higher molecular weight sulfones are not as numerous as those for the low molecular weight sulfones.

In accordance with the present invention, the foregoing organic sulfides are oxidized and subsequently disproportionated in the presence of osmium tetroxide as a catalyst and an oxide of nitrogen compound. The oxide of nitrogen may be added per se or it may be derived from an oxide of nitrogen liberating compound such as, for example, nitric acid and nitrous acid.

Examples of oxides of nitrogen which are suitably used in the process of this invention are nitric oxide (NO), nitrogen dioxide ($NO_2$), nitrogen pentoxide ($N_2O_5$), nitrogen tetroxide ($N_2O_4$) and nitrogen trioxide ($N_2O_3$). The oxide of nitrogen may be added in an undiluted state or in solution, for example, in an aqueous solution. The preferred oxide of nitrogen compounds which are used in accordance with the present invention are nitrogen dioxide and nitric oxide and since nitric acid is a convenient source of nitrogen dioxide and nitric oxide, it is also preferred. For the purposes of the present invention, nitric acid will be included under the group referred to herein as oxide of nitrogen compounds.

The osmium tetroxide catalyst may be generated in situ by the addiiton of osmium metal, or any compound of osmium, and an oxide of nitrogen compound to the reaction mixture.

In the absence of an oxide of nitrogen compound, the osmium tetroxide catalyst is gradually reduced to a lower oxidation state in which form it is no longer an effective catalyst. It is then necessary to remove the reduced catalyst by filtration or by distillation of the volatile organic materials and then recover the reduced catalyst from the distillation residue. It is most desirable to convert a major portion or all of the sulfide reactant to sulfone and by the process of the present invention, it is possible to obtain a small or a complete conversion of the sulfide material depending upon the reaction conditions herein described.

In the process of this invention, it has been found that the addition of an oxide of nitrogen compound such as an oxide of nitrogen, or an oxide of nitrogen liberating compound such as nitric acid, to the reaction mixture prevents the reduction of osmium tetroxide during the disproportionation reaction. This result is unexpected since it is known that osmium metal is uneffected by dilute nitric acid or the oxides of nitrogen.

It has also been found in the present invention that the addition of oxygen, or an oxygen-containing gas such as air, to the reaction mixture containing organic sulfide, osmium tetroxide, and an oxide of nitrogen or an oxide of nitrogen liberating compound, either by bubbling the oxygen or air into the reaction mixture or by pressuring the oxygen or air into a closed vessel under superatmospheric pressure, effects the complete oxidation of sulfide to sulfone. Complete oxidation of the sulfide to the sulfone may also be accomplished by employing a sufficient excess of the oxide of nitrogen compound, without the aid of oxygen, i. e. by employing preferably a weight ratio of oxide of nitrogen compound to sulfide not in excess of 20 to 1. When oxygen is employed to aid in the oxidation of sulfide and to prevent rapid depletion of the oxide of nitrogen compound, it is used in a weight ratio of at least 1 to 2 oxygen to organic sulfide.

The reaction may be conducted in either an aqueous or a non-aqueous system. When an aqueous system is used the rate and heat of reaction are more easily controlled. However, it is generally necessary to use a larger amount of osmium tetroxide catalyst in the dilute solution.

The non-aqueous reaction system may be used in the absence of a diluent, or if a diluent is desired it must be of a type which will not reduce the catalyst. For example, alcohols and aldehydes are not suitable, but exemplary of useful solvents are chloroform, benzene, nitrobenzene, toluene, xylene, acetic acid and cyclohexane.

The weight ratio of osmium tetroxide to organic sulfide in an aqueous reaction system varies between about $1 \times 10^{-7}$ to 1 and about $1 \times 10^{-4}$ to 1, preferably between about $1 \times 10^{-5}$ to 1 and about $1 \times 10^{-4}$ to 1, whereas in a non-aqueous reaction system the weight ratio varies between about $1 \times 10^{-8}$ to 1 and about $1 \times 10^{-4}$ to 1, preferably between about $1 \times 10^{-6}$ to 1 and about $1 \times 10^{-4}$ to 1. When small amounts of osmium tetroxide are employed in the reaction, it is usually preferred to increase the amount of the inorganic oxide of nitrogen compound accordingly. Larger quantities of catalyst may be used, if desired, but such larger amounts produce no process advantage and represents an unnecessary operational expense.

In an aqueous system the amount of water used is limited only by practical considerations of separation and isolation of the product, and in an aqueous system the reaction is generally effected at a temperature in the range of about 65° C. to about 180° C., preferably between about 80° C. to about 150° C. The reaction rate is low at temperatures below about 70° C. and the most desirable reaction temperature is about 100° C. with the upper limit of temperature being determined only by the thermal stability of the reactants, the intermediates, and the products of reaction. The reaction time may be in the range of about a few minutes to 24 hours, although longer reaction times may be used, if desired.

In the non-aqueous reaction system the temperature may be in the range of about 18° C. to about 200° C., preferably about 50° C. to about 120° C., and the reaction time is in the range of a few minutes to 24 hours, although longer reaction times may be used, if desired.

The oxide of nitrogen compound may be conveniently added in the form of nitric acid and the weight ratio of 6 N nitric acid to organic sulfide is in the range of from about 1 to 1000 to about 10 to 1. Higher weight ratios of nitric acid may be used but such ratios do not offer any particular process advantage. When the oxide of nitrogen is added per se the weight ratio of oxide of nitrogen to organic sulfide is the same, that is, in the range of 1 to 1,000 to 10 to 1.

When it is desirable to convert a major portion or substantially all of the sulfide to sulfone, an excess of the oxide of nitrogen compound is employed when oxygen is not added to the system. However, it is a preferred embodiment of the present invention, particularly when the total conversion of sulfide to sulfone is desired, to employ oxygen in the reaction. When oxygen or air is bubbled through the reaction mixture or pressured into a closed vessel containing the reaction mixture, the weight ratio of oxygen to organic sulfide is in the range of between about 1 to 2 and about 2.5 to 1. The weight ratio of oxygen to sulfide to oxide of nitrogen compound is most preferably between about 0.7 to 1 to 0.5 and about 2 to 1 to 0.01.

The reaction may be conducted in a batchwise or continuous manner and in the batch process the organic sulfide, osmium tetroxide, and oxide of nitrogen compound are heated to the reaction temperature while oxygen or air is bubbled through the reaction mixture, or the reactants may be heated in a pressure vessel. As the reaction is exothermic, it continues without the addition of further heat when the reaction temperature is reached. The rate of reaction may be controlled by initially introducing the osmium tetroxide catalyst, oxide of nitrogen compound and oxygen into the reactor, after which the sulfide is gradually added. The reaction products are isolated by distillation or any other convenient method and the products may be characterized by boiling point, melting point, mixed melting point and infrared spectroscopy.

The reactions may be effected at atmospheric pressure or at super-atmospheric pressure up to 1000 p. s. i. g.; super-atmospheric pressure being used when it is desired to retain lower boiling products or diluents, such as water, within the reaction zone at high temperatures, or if it is desired to pressure oxygen into the reaction mixture.

One method of performing the process of the invention continuously comprises heating osmium tetroxide, the oxide of nitrogen compound and a small amount of organic sulfide in a reactor, and continuously adding more sulfide when the reaction starts while maintaining the temperature in the bottom of the reactor at the desired temperature. Oxygen may be added throughout the reaction if so desired. The reaction takes place in an intermediate portion of the reactor and the sulfone is continuously bled off from the bottom of the reactor while the sulfide is recycled to the system by distillation.

The following examples are offered as a better understanding of the present invention and are not to be construed as unnecessarily limiting thereto.

*Example 1*

Dimethyl sulfide (20.0 grams), 6 N HNO₃ (5.0 grams), water (10.0 grams), and osmium tetroxide (0.1 gram) were placed in an Aminco bomb after which the bomb was pressured to 500 p. s. i. with oxygen. The reaction mixture was then heated at a temperature of 120° C. to 125° C. for a period of 3 hours, but the observed pressure drop secured within 15 minutes. Dimethyl sulfone (21.5 grams) was isolated by distillation in 91.6 percent yield. Neither dimethyl sulfide or dimethyl sulfoxide could be detected in the distillate or residue, but osmium tetroxide was shown to be present in the reaction mixture by the thiourea-HCl color test described in J. W. Mellor, in "A Comprehensive Treatise on Inorganic and Theoretical Chemistry," vol. XV, p. 698, Longmans, Green & Co., New York (1936).

*Example 2*

Methyl phenyl sulfide is substituted for dimethyl sulfide and reacted under the conditions set forth in Example 1. The product, about 90 percent methyl phenyl sulfone, is isolated by distillation.

*Example 3*

Diphenyl sulfide is substituted for dimethyl sulfide and reacted under the conditions set forth in Example 1. The product, about 80 percent diphenyl sulfone, is isolated by distillation.

*Example 4*

Thioxane is substituted for dimethyl sulfide and reacted under the conditions set forth in Example 1. The product, about 85 percent thioxane sulfone, is isolated by distillation.

*Example 5*

Into a bomb was charged 20 grams of diethyl sulfide, 0.01 gram of osmium tetroxide, 20 grams of water and 2 grams of nitric oxide after which the bomb was pressured to 100 p. s. i. g. of oxygen. The mixture was heated at a temperature between about 110° C. and 112° C. for a period of one hour. The products which were isolated by distillation were: diethyl sulfide (6.5 grams), diethyl sulfoxide (9.3 grams) and diethyl sulfone (6.7 grams or 24.5 percent yield).

*Example 6*

Into a steel bomb was charged 30 grams of diethyl sulfide, 0.05 gram of osmium tetroxide, 10 grams of water and 5 grams of 6 N nitric acid, after which the bomb was pressured to 500 p. s. i. g. of oxygen. The mixture was heated at a temperature from 120° C. to 125° C. for three hours. No diethyl sulfide was found in the product and diethyl sulfoxide (20.8 grams or 69.3 percent) and diethyl sulfone (6.29 or 18.2 percent) were isolated by distillation.

*Example 7*

3,3-bis(ethylthio)pentane (10 grams), nitrogen dioxide (3 grams), and osmium tetroxide (0.05 gram) are placed in an Aminco bomb after which the bomb is pressured to 300 p. s. i. g. with oxygen. The reaction mixture is heated to about 120° C. for a period of three hours. Tetronal (90 percent yield) is separated by distillation.

It is to be understood, without departing from the scope of this invention, that any of the other previously described organic sulfides, particularly the hydrocarbon sulfides having between 2 and 20 carbon atoms in the molecule by substitution of the starting organic sulfide in the examples with another organic sulfide can be converted to the corresponding sulfone in good yields. Some examples of preferred sulfides which can be substituted in the above examples and converted under the conditions illustrated are methyl octyl sulfide which can be converted to methyl octyl sulfone; methyl ethyl sulfide which can be converted to methyl ethyl sulfone; methyl butyl sulfide which can be converted to methyl butyl sulfone; ethyl propyl sulfide which can be converted to ethyl propyl sulfone; and 2,2-bis(ethylthio)propane which can be converted to sulfonal.

Having thus described our invention, we claim:

1. In a process for the oxidation of a sulfide containing a

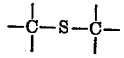

group in the presence of an inorganic oxide of nitrogen compound as an oxidizing agent; the improvement which comprises conducting said oxidation in the presence of osmium tetroxide as a catalyst to produce a sulfone as a product of the process.

2. The process of claim 1 wherein nitric acid is employed as an oxidizing agent.

3. The process of claim 1 wherein nitric oxide is employed as an oxidizing agent.

4. The process of claim 1 wherein nitrogen dioxide is employed as an oxidizing agent.

5. The process of claim 1 wherein nitrogen trioxide is employed as an oxidizing agent.

6. The process of claim 1 wherein nitrogen pentoxide is employed as an oxidizing agent.

7. The process of claim 1 wherein the sulfide is thioxane.

8. In a process for the oxidation of a hydrocarbon sulfide containing a

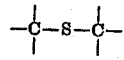

group in the presence of an inorganic oxide of nitrogen compound as an oxidizing agent; the improvement which comprises conducting said oxidation in the presence of osmium tetroxide as a catalyst to produce a hydrocarbon sulfone as a product of the process.

9. In a process for the oxidation of a hydrocarbon sulfide containing a

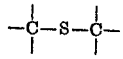

group with an inorganic oxide of nitrogen compound as an oxidizing agent; the improvement which comprises conducting said oxidation in a non-aqueous system at a temperature between about 18° C. and about 200° C. in the presence of osmium tetroxide as a catalyst to produce a hydrocarbon sulfone as a product of the process.

10. In a process for the oxidation of a sulfide containing a

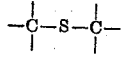

group in the presence of oxygen as an oxidizing agent; the improvement which comprises conducting said oxidation in the presence of an inorganic oxide of nitrogen compound as an additional oxidizing agent, and osmium tetroxide as a catalyst to produce a sulfone as a product of the process.

11. In a process for the oxidation of a hydrocarbon sulfide containing a

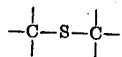

group, in the presence of oxygen as an oxidizing agent; the improvement which comprises conducting said oxidation in the presence of an inorganic oxide of nitrogen compound as an additional oxidizing agent, and osmium tetroxide as a catalyst in a non-aqueous system at a temperature between about 18° C. and about 200° C. to produce a sulfone as a product of the process.

12. In a process for the oxidation of an aliphatic hydrocarbon sulfide containing a

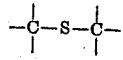

group in the presence of oxygen as an oxidizing agent; the improvement which comprises conducting said oxidation in the presence of an inorganic oxide of nitrogen compound as an additional oxidizing agent, and osmium tetroxide as a catalyst in a weight ratio of osmium tetroxide to said sulfide of between about $1 \times 10^{-8}:1$ and about $1 \times 10^{-4}:1$, to produce an aliphatic hydrocarbon sulfone as a product of the process.

13. In a process for the oxidation of an aliphatic hydrocarbon sulfide containing a

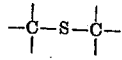

group, in the presence of an inorganic oxide of nitrogen compound as an oxidizing agent; the improvement which comprises conducting said oxidation in the presence of osmium tetroxide as a catalyst in a weight ratio of osmium tetroxide to said sulfide of between about $1\times10^{-8}:1$ and about $1\times10^{-4}:1$, to produce an aliphatic hydrocarbon sulfone as a product of the process.

14. The process of claim 8 wherein the hydrocarbon sulfide comprises dimethyl sulfide.

15. The process of claim 8 wherein the hydrocarbon sulfide comprises diethyl sulfide.

16. The process of claim 8 wherein the hydrocarbon sulfide comprises diphenyl sulfide.

17. The process of claim 8 wherein the hydrocarbon sulfide comprises 3,3-bis(ethylthio)pentane.

18. In a process for the oxidation of a sulfide containing a

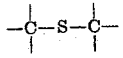

group with an inorganic oxide of nitrogen compound as an oxidizing agent; the improvement which comprises conducting said oxidation in an aqueous system at a temperature between about 65° C. and about 180° C. in the presence of osmium tetroxide as a catalyst to produce a sulfone as a product of the process.

19. In a process for the oxidation of a hydrocarbon sulfide containing a

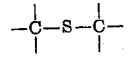

group, in the presence of oxygen as an oxidizing agent, the improvement which comprises conducting said oxidation in the presence of an inorganic oxide of nitrogen compound as an additional oxidizing agent and osmium tetroxide as a catalyst in an aqueous system at a temperature of between about 65° C. and about 180° C. to produce a hydrocarbon sulfone as a product of the process.

References Cited in the file of this patent
UNITED STATES PATENTS

| | | |
|---|---|---|
| 2,548,922 | Wagner et al. | Apr. 17, 1951 |
| 2,581,050 | Smedslund | Jan. 1, 1952 |
| 2,702,824 | Wetterholm et al. | Feb. 22, 1955 |